United States Patent [19]

Tsai

[11] Patent Number: 5,107,921
[45] Date of Patent: Apr. 28, 1992

[54] MULTI-MODE HEAT EXCHANGER

[76] Inventor: Frank W. Tsai, 1842 Alpine Dr., San Marino, Calif. 91108

[21] Appl. No.: 354,368

[22] Filed: May 19, 1989

[51] Int. Cl.$^5$ .......................... F28F 13/08; F28F 9/06
[52] U.S. Cl. .................................. 165/108; 165/158; 165/137
[58] Field of Search ............... 165/132, 137, 157, 158, 165/108, 139

[56] References Cited

U.S. PATENT DOCUMENTS

| | | | |
|---|---|---|---|
| 1,275,231 | 8/1918 | Dow et al. | 165/108 |
| 1,980,623 | 11/1934 | Kay et al. | 165/108 |
| 2,487,484 | 11/1949 | Simpelaar | 165/137 |
| 2,556,186 | 6/1951 | Hegenbarth | 165/108 |
| 3,642,452 | 2/1972 | Roget et al. | 165/108 |
| 4,105,065 | 8/1978 | Chirico | 165/137 |
| 4,403,650 | 9/1983 | Klaren | 165/108 |
| 4,418,749 | 12/1983 | Vasiliev et al. | 165/139 |
| 4,427,053 | 1/1984 | Klaren | 165/108 |
| 4,651,820 | 3/1987 | Knapp | 165/137 |
| 4,768,580 | 9/1988 | Ferguson | 165/132 |

FOREIGN PATENT DOCUMENTS

| | | | |
|---|---|---|---|
| 172113 | 5/1918 | Fed. Rep. of Germany | 165/158 |
| 861991 | 11/1952 | Fed. Rep. of Germany | 165/108 |
| 643667 | 9/1928 | France | 165/108 |
| 914922 | 3/1982 | U.S.S.R. | 165/158 |
| 413602 | 7/1934 | United Kingdom | 165/158 |
| 1023777 | 3/1966 | United Kingdom | 165/158 |

Primary Examiner—John Rivell
Assistant Examiner—L. R. Leo
Attorney, Agent, or Firm—William W. Haefliger

[57] ABSTRACT

Heat exchanger apparatus for quenching hot hydrocarbon fluid feeds, of different compositions, so as to minimize coking including a shell, and baffle structure in the shell, defining spaced first and second chambers and primary inlet and outlet ports to flow the fluid to and from the shell via the two chambers, the shell and baffle structure also defining a third chamber between the first and second chambers, with secondary inlet and outlet ports communicating with the third chamber to flow quench fluid to and from the third chamber, and pipes of different bore sizes extending through the third chamber, and communicating between the first and second chambers, for passing the hydrocarbon fluid in a selected path or paths via the pipes and first and second chambers, in flowing between the primary inlet and outlet ports.

8 Claims, 6 Drawing Sheets

MULTI-MODE HEAT EXCHANGER

BACKGROUND OF THE INVENTION

This invention relates generally to indirect rapid cooling, known as quenching, of chemical reactor effluent, for example; and more particularly it concerns improvements in feedstock flexibility to the reactor, as respects yield of primary reaction products, on stream time, and reduction of investment (i.e. simpler cooling apparatus).

Specially designed heat exchangers are used in close couple to the reactor outlet tube. They are known as the transferline exchanger (TLE or TLX), quench exchanger, quench cooler, or quench boiler. Both shell and tube, and double pipe heat exchangers have been used. In this regard, in many chemical reactions, quenching of reactor effluent is required to control the reactions, so that primary products will not undergo secondary reactions. Secondary reactions will not only reduce the yield of valuable primary products but also produce coke which fouls the TLE. Fouling of the TLE has the following effects:

1. Increase in reactor system pressure; thus, yield of primary products decreases with higher system pressure.
2. Energy recovery from the reactor effluent (as for example, heat energy) will decrease.

When fouling is excessive, the TLE is shut down for cleaning, known as a decoking operation. Since the TLE is coupled with the reactor, the latter will also be shut down. When the reactor is shut down, the production and revenue are reduced, at great expense.

In chemical manufacturing processes, feedstock flexibility is very important. The process must be able to operate on many hydrocarbon feedstocks which are available on the market. To increase feedstock flexibility of a chemical process, more equipment and complicated design of same are required. For example, in olefins manufacturing, ethylene can be made from almost any petroleum products, such as ethane, propane, butanes, naphtha, diesel, kerosene, gas oil, etc. Ethylene is made by pyrolysis of these hydrocarbons in the presence of steam in a tubular reactor. The TLE is then used to quench the reactor effluent. Typical operating conditions of the TLE are as follows:

|  | Shell Side | Tube Side |
| --- | --- | --- |
| Pressure, PSIG | 400 to 2,000 | 0 to 50 |
| Temperature, degrees F. | 440 to 640 | 1300 to 1800 |

In the above, the tube side conditions are at inlet; the pressure drop through the tube side is 0.3 to 2.0 PSI; and the tube side outlet temperature depends upon the feedstock used in the reactor and the shell side quenching medium. These large temperature and pressure differences present problems in design and construction of the TLE. In the quenching process where the temperature of the reactor effluent is reduced, its thermal energy is transferred into the quenching medium, such as vaporization of boiler feed water into steam, superheating steam, or preheating feed.

The design requirements of a TLE are as follows:
1. The residence time in the transferline between the reactor outlet and the TLE inlet must be kept short. Short residence time retards the degradation of primary products.
2. The transition between the reactor outlet tube and TLE inlet tube must have a stream line flow to minimize back mixing which promotes coke formation and fouling.
3. The on stream time must be long, so that the loss of production due to shut-down for decoking is small.
4. The TLE must have a low initial pressure drop, and furthermore, coking must have little effect on the pressure drop.
5. TLE maintenance must be easy and simple.
6. The TLE must operate to maximize energy recovery.
7. The TLE must have feedstock flexibility.
8. The TLE must be cost effective.
9. The TLE must be compact and easy to install.

A practical solution to satisfy these objectives, prior to the present invention was not known.

SUMMARY OF THE INVENTION

It is a major objective of the invention to provide an improved quench exchanger to satisfy the above requirements. Basically, the invention is embodied in heat exchanger apparatus for quenching hot hydrocarbon fluid feeds, of different compositions, so as to minimize coking, the combination, comprising:

a) a shell, and baffle means in the shell, defining spaced first and second chambers, and primary inlet and outlet ports to flow said fluid to and from the shell via the two chambers, b) the shell and baffle means also defining a third chamber between the first and second chambers, with secondary inlet and outlet ports communicating with the third chamber to flow quench fluid to and from the third chamber, c) and pipes of different bore sizes extending through the third chamber, and communicating between the first and second chambers, for passing the hydrocarbon fluid in a selected path or paths via the pipes and first and second chambers, in flowing between said first inlet and outlet ports. As will be seen, the exchanger differs from the conventional multi tube-pass heat exchanger which has a constant diameter for all tubes, and wherein the numbers of tubes per pass are the same. The present exchanger encompasses a combination of three or more heat exchangers in one shell, the tube diameters being different for each pass, and there are a different number of tubes per pass. For example, a three tube pass TLE consists of:

1. The first tube-pass (inlet pass) consists of a single tube which is connected to the reactor outlet tube of the same diameter;
2. The second tube-pass consists of also a single tube which has a diameter equal to or larger than the inlet tube (the first tube). This tube can be used as the third-pass (outlet pass), depending on the feedstock; and
3. The third tube-pass (outlet pass) consists of several small diameter tubes. These tubes can be used in the second-pass, also depending on the feedstock. The number of the small tubes used can be changed by plugging and unplugging of tubes from both ends. The small tube diameter is less than that of the first tube.

Hence the tube side configuration has the following flexibility:

1. The number of tube passes can be varied from one, to two, to three;
2. The length of tube pass of the single tube can be varied from one to two tubes; and
3. The number of operating tubes with small diameter can be adjusted.

Accordingly, the TLE can control the outlet temperature and provide quenching for all or multiple hydrocarbon feedstocks used in chemical reaction processes. The first tube pass remains as the inlet pass for all feedstocks; the other two tube sections vary as the feedstock to the reactor varies; and internal crossover piping, and plugs as shown, are used to arrange and change the flow passes of these two tube sections, as will be seen.

Also, the TLE is very compact, it can be installed in vertical or horizontal positions; the reactor effluent can be up-flow or down-flow; the inlet nozzle can be at the top, bottom, or side; the outlet nozzles can be at the top, bottom, or side; and it is easy and simple to clean all tube passes at the same time once the shell or housing end heads are opened or removed.

These and other objects and advantages of the invention, as well as the details of illustrative embodiments, will be more fully understood from the following specification and drawings, in which:

DETAILED DESCRIPTION

Figure 1:
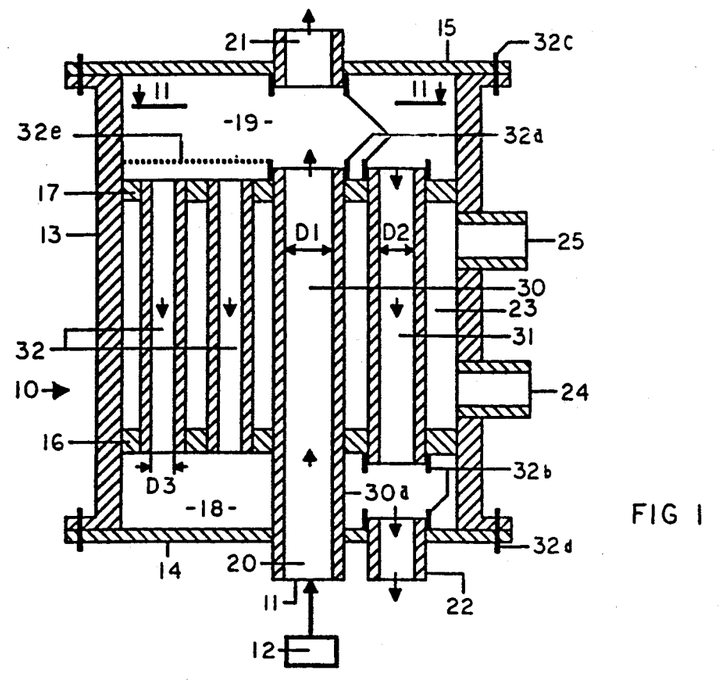
FIG. 1 is a vertical section taken through a quench-exchanger showing one configuration.

In FIG. 1, exchanger 10 is operable to quench a hydrocarbon feed fluid introduced at 11, from a chemical reactor 12. Such feeds may have different chemical compositions, and the design of the exchanger is such as to minimize cost of construction, to minimize coking, and otherwise to meet the requirements set forth above.

The exchanger includes a steel shell 13, as in the shape of a cylinder, having removable end closures 14 and 15. The shell and baffle means in the shell (such as baffles 16 and 17) define axially spaced first and second chambers 18 and 19, and primary inlet and outlet ports 20 and 21, to flow the hot hydrocarbon feed to and from the shell, via the two chambers 18 and 19. A third primary exit port is also provided at 22, at the closure 14.

The shell and baffle means also define a third chamber 23 between the first and second chambers 18 and 19, with secondary inlet and outlet ports 24 and 25 communicating with chamber 23 to flow quench fluid into and from chamber 23. For example, water may be introduced at 24, and steam removed at 25. Stub pipes may define ports 21, 22, 24 and 25.

Figure 11:
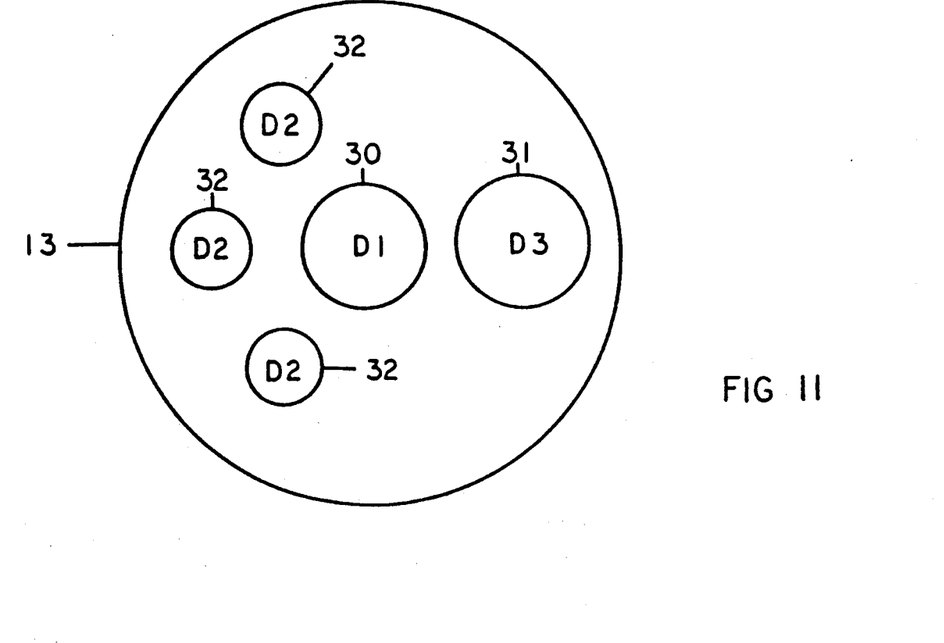
FIG. 11 is a section on lines 11—11 of FIG. 1.
Figure 12:
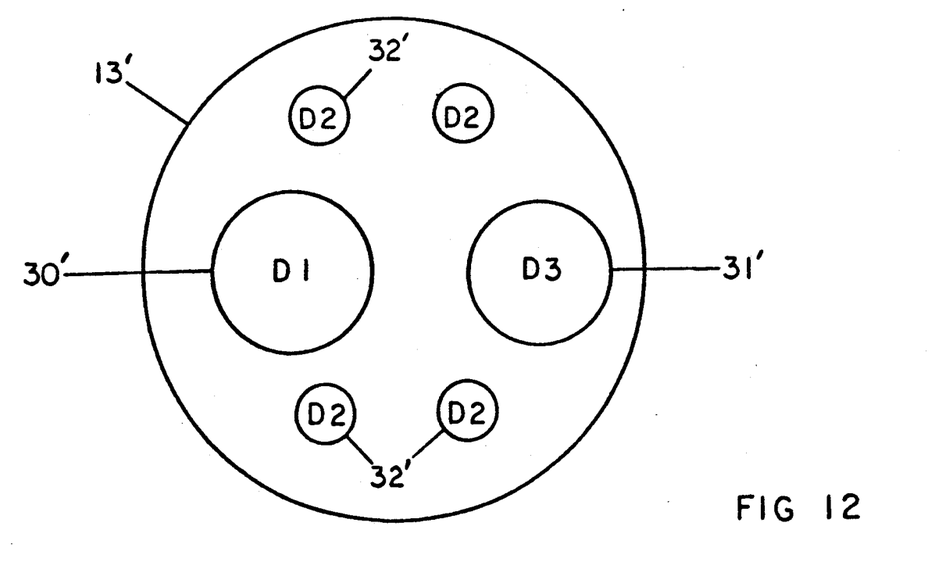
FIG. 12 is a view like FIG. 11, showing a modification (different positioning of large and small tubes).

Pipes of different bore sizes extend through chamber 23, to communicate between chambers 18 and 19, for passing the hot hydrocarbon fluid in a selected path, or "pass" or "passes", via the pipes and or chambers, in flowing from 20 to 21. See pipe 30 of relatively large diameter $D_1$, pipe 31 of relatively larger diameter $D_2$, and pipes 32 of relatively reduced diameter $D_3$. All such pipes extend between and may be connected to 16 and 17. FIG. 11 shows pipe positions; and FIG. 12 is a modification. Removable couplings are seen at 32a–32d, and a coke screen at 32e.

Figure 2:
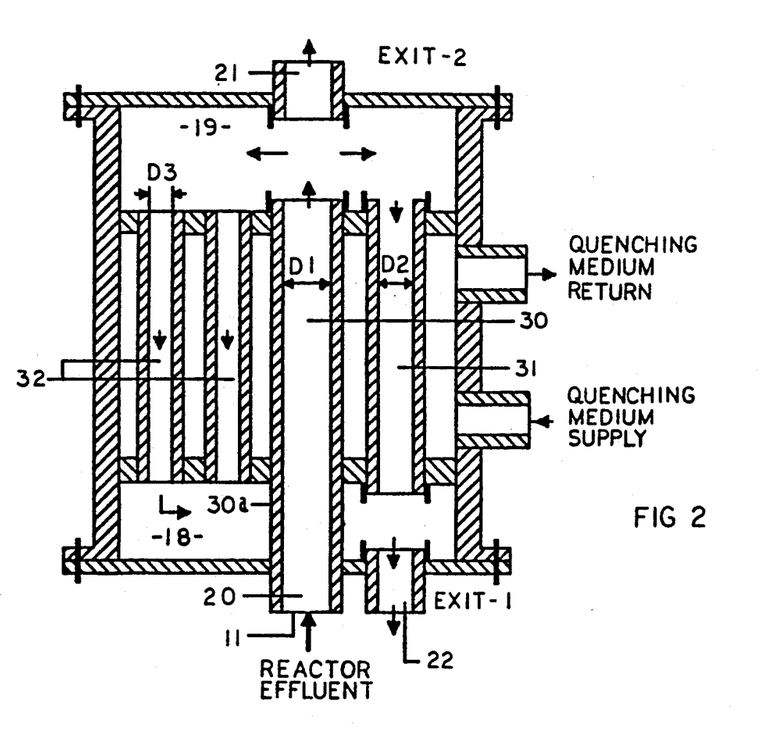
FIGS. 2-7 are vertical sections taken through basically the same quench-exchanger, fitted for different input feeds.

In FIG. 2, which is like FIG. 1, reactor effluent passes from 20 through pipe 30 (via extension 30a in chamber 18) and into chamber 19. Some effluent passes directly to outlet 21 and the remainder to outlet 22, via pipes 31 and 32 and via chamber 18, so that a combination single-pass, double-pass unit is provided.

Figure 3:
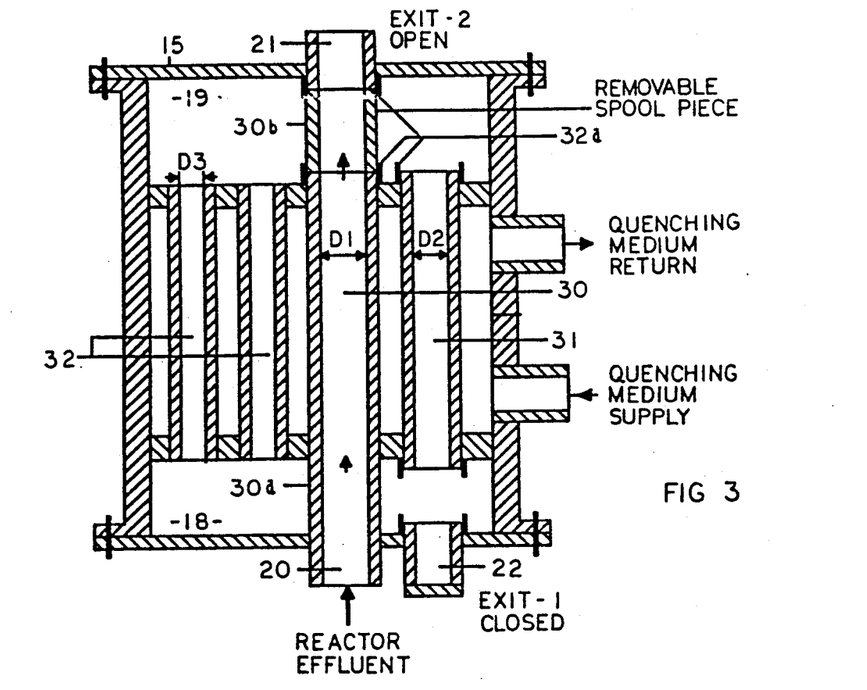

In FIG. 3 (one-pass example) all reactor effluent (such as gas oil) passes from inlet 20 to outlet 21 via pipe 30 and pipe extensions 30a and 30b. Section 30b is easily added after removal of end closure 15, and by use of couplings 32a. FIG. 3 is otherwise the same as FIG. 1.

Figure 4:
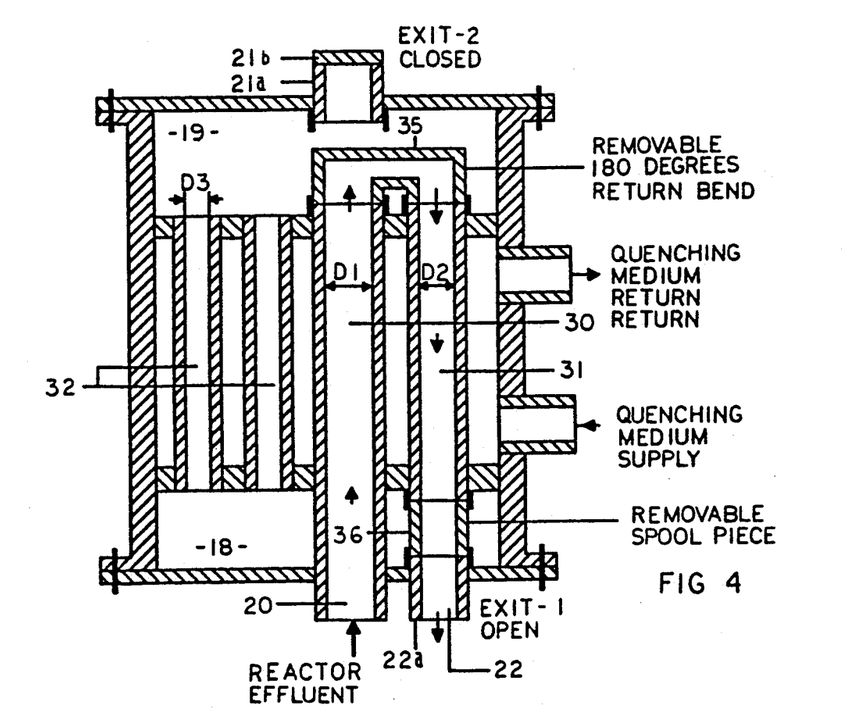

In FIG. 4 (two-pass example) a U-shaped pipe 35 in the form of a return bend in chamber 19 interconnects the upper ends of pipes 30 and 31, so that all reactor effluent passes from inlet 20 to outlet 22 in a two-pass mode, and via large diameter pipes only. A removable stub pipe or spool piece 36 is coupled between the lower end of pipe 31 and stub pipe 22a, which is open. Pipe 21a is closed at 21b. A typical feed consists of kerosene.

Figure 5:
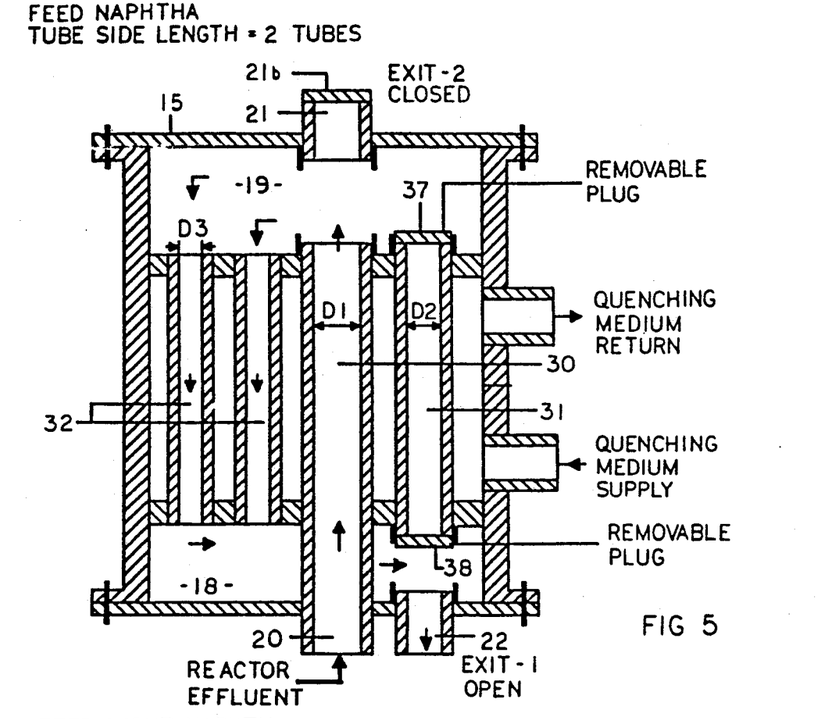

In FIG. 5, exit 21 is closed at 21a, and pipe 31 closed by plugs 37 and 38, so that all reactor effluent passes from inlet 20 to outlet 22, in a two-pass mode, via large bore pipe 30 (one-pass), chamber 19, and via small bore pipes 32 (second pass), and chamber 18. A typical feed is heavy naphtha.

Figure 6:
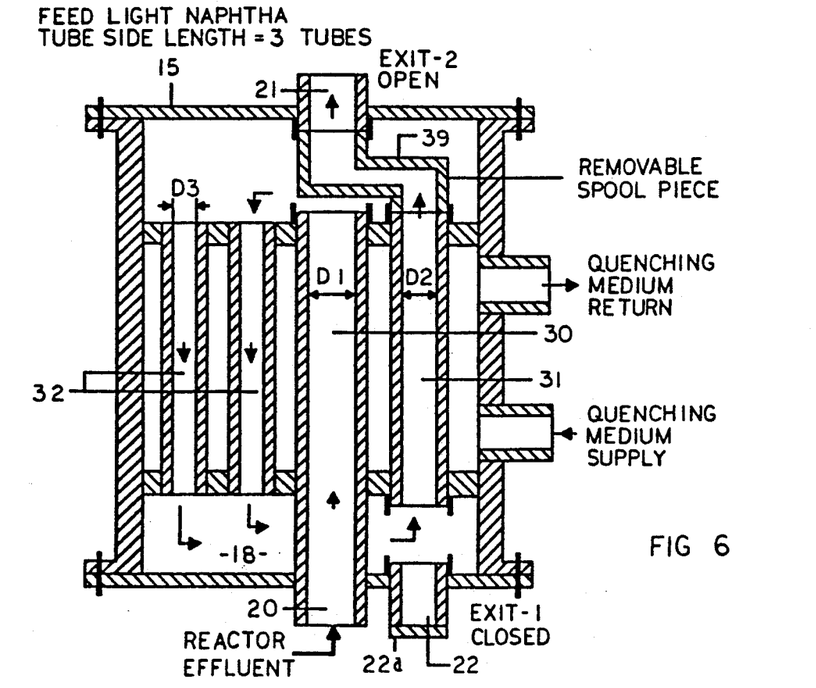

In FIG. 6, exit 22 is closed at 22a and reactor effluent passes via pipe 30 to chamber 19, (one pass); then it flows via small pipes 32 (second pass) to chamber 18; then it flows via large pipe 31 (third pass) to the outlet 21 via dog-leg pipe 39 in chamber 19. Couplings 32a facilitate these connections after closure 15 is removed. A typical feed is light naphtha.

Figure 7:
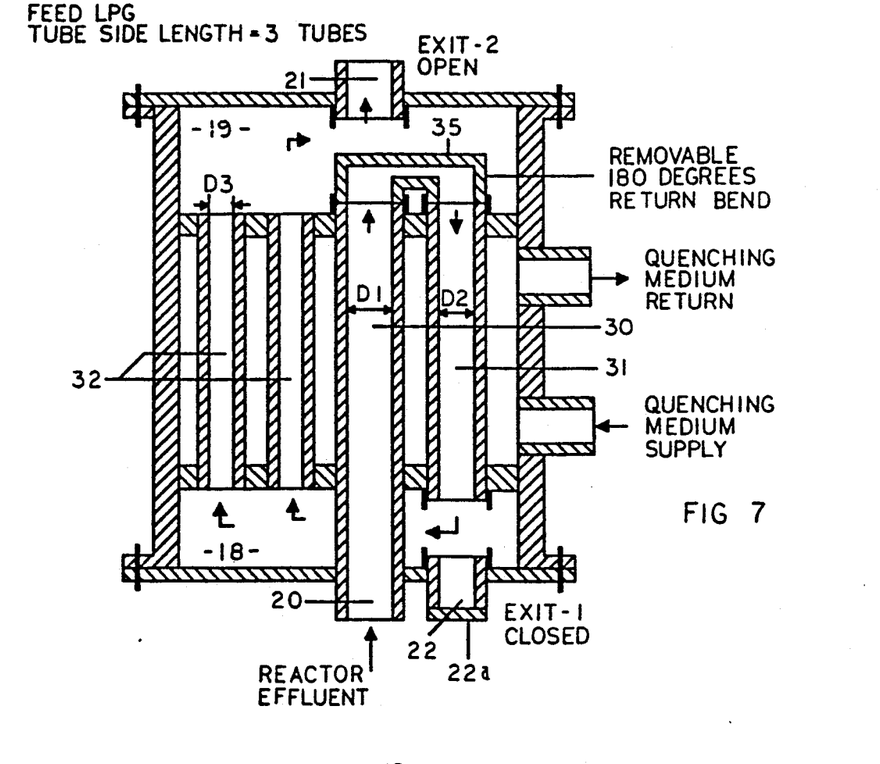

In FIG. 7, the arrangement again incorporates a U-shaped pipe 35, as in FIG. 4; however, the pipe 31 opens into chamber 18 so that fluid then flows back up through tubes 32 (third pass) into chamber 19, and to outlet 21. Outlet 22 is closed at 22a. A typical feed is liquified petroleum gas (LPG).

A typical application can be found in the olefins manufacturing process. The building block of petrochemical industry is ethylene. It is made from pyrolysis of various hydrocarbons at elevated temperature in the presence of steam. The hydrocarbons are decomposed at 1,300 to 1,800 degrees F in a tubular reactor. The pressure is between 0 to 50 PSIG. In order to stop reactions at the reactor outlet, rapid quenching is necessary to minimize product degradation.

The TLE of the present invention is used to provide quenching of reaction products. In order to minimize product degradation, the residence time between the reactor outlet and the TLE is kept very short. Furthermore, the transition from reactor to TLE is in stream line to prevent back mixing.

The shell and tube TLE has relative large volume of inlet channel. This volume is larger than that of the double pipe TLE. Therefore, residence time of the shell and tube TLE is higher than that of the double pipe TLE. The large inlet volume provides long residence time of the reactor product which promotes product degradation. High product degradation must be avoided because it forms coke and fouls the TLE.

The known double pipe TLE has relatively small volume of inlet channel. It also has a stream line transition section between the TLE and the reactor outlet tube. The diameter of the inner tube of the double pipe TLE is the same as the diameter of the reactor outlet tube. This makes direct coupling of reactor and TLE very easy, and provides a very short residence time; however, the drawback of the known double pipe TLE is the large number of such devices required. They are very costly, and the double pipe TLE requires longer length, making the support structure more complicated.

At the present time, the three stages of quenching are commonly done with three separate TLE's operating in series. They require more space, interconnecting piping, and auxiliary structures. The operation and maintenance of three TLE's are more complicated than for one TLE.

As feedstock to the reactor becomes heavier, fouling of TLE shifts from the inlet toward the outlet, and less tube passes are used. The following tube-side designs are desirable:

| Feedstock | Tube Length | Initial | Middle | Final |
|---|---|---|---|---|
| LPG | 3 | Large tube | Large tube | Small tubes |
| Light Naphtha | 3 | Large tube | Small tubes | Large tube |
| Heavy Naphtha | 2 | Large tube | none | Small tube |
| Kerosene | 2 | Large tube | none | Large tube |
| Gas Oil | 1 | Large tube | none | none |

The first tube should have the same diameter as the reactor outlet tube. In pyrolysis of hydrocarbons, coke is formed in the tubular reactor. Pieces of coke may spall from the reactor tube wall and are carried to the TLE by the hydrocarbons flow. If the tube diameter of the TLE is the same as the reactor outlet tube, there is very little chance that the TLE tube will be plugged by the spalled coke. This is not true for the shell and tube TLE where there are many tubes with diameter smaller than the reactor outlet tube, and where plugging of tubes by spalled coke has been common. Furthermore, the transferline volume of double pipe TLE is minimized because there is no inlet channel. Stream line flow is obtained because there is no change in diameter of the two connecting tubes.

The length of the inlet tube pass can be one tube as shown in FIG. 3 herein; or two tubes connected by a 180 degree return bend in chamber 19, as shown in FIG. 4. The diameter of the second tube is equal to or larger than the first tube. The reason is that in cracking heavy feedstock, such as kerosene and diesel, the fouling of TLE appears at the outlet end where the temperature of the reactor effluent is low. When coke is deposited on the inside wall of the tube, the flowing area is reduced. When the flowing area is reduced, system pressure drop will increase. (High pressure drop will reduce the performance of the reactor). Increasing the diameter of the outlet tube 31 in FIG. 4 provides more flowing area. It also minimizes the effect of variation in system pressure drop.

For naphtha, depending on the feedstock characteristics, and reaction severity, the length of tube passes can be two or three tubes. For heavy naphtha, the length will be two tubes, see FIG. 5. The reactor effluent will flow through the large inlet tube and then to and through the small tubes. The other large tube 31 is deactivated by plugging both ends, as shown. With the length of tube pass equal to two tubes, the outlet temperature is kept high, thus cold end fouling is minimized.

For light naphtha, additional cooling can be obtained by increasing the length of tube pass, from two to three tubes. FIG. 6 shows the tube side arrangement. It adds another large diameter tube to the two-tube pass arrangement of FIG. 5. The inlet large tube 30 remains the same as for other feedstocks. It is followed by the small tubes 32 where no fouling due to condensation will occur. The outlet tube 31 is of larger diameter for the same reason stated for the kerosene/diesel feedstock arrangement (FIG. 4).

For LPG feedstocks consisting of ethane, propane, butanes, and natural gas liquids, the length of tube pass is three tubes. The first two are large diameter tubes. They are followed by small diameter tubes. Since in LPG cracking, the fouling occurs in the inlet section of TLE, large diameter tubes will provide longer on stream time.

The number of tube passes can be four or even more. However, with high number of tube passes, the design becomes more complicated and it is less cost effective. Similarly, a two pass TLE will have less feedstock flexibility.

Advantages of the invention include:
1. A single shell heat exchanger having multi-tube passes of different tube diameters and numbers of tubes per pass.
2. The number of tube passes can be varied.
3. The exchanger can be used to quench reactor effluent of a wide range of feedstocks.
4. The exchanger has a low pressure drop, and tube fouling does not affect the pressure drop.
5. Since the exchanger is a single shell, the piping, and structural are greatly simplified compared with multi-shell exchangers.
6. Since the exchanger is compact, the position and location of installation can be varied to fit the structural and operational requirements.
7. The large diameter inlet tube provides stream line flow, which reduces fouling and it is favorable for long on stream time.
8. The cost is less than multi shell heat exchangers.

Figure 8:
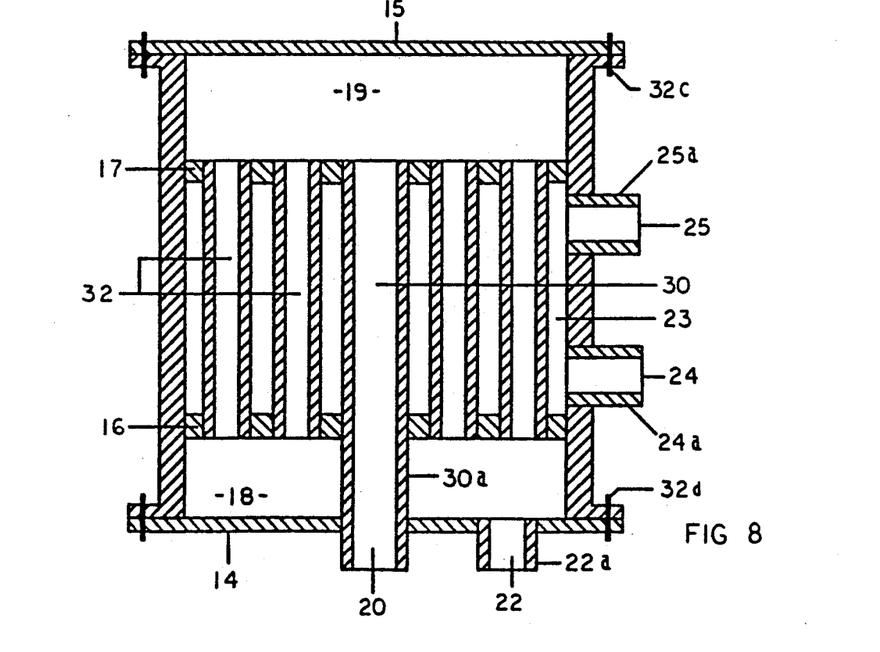
FIGS. 8-10 show a different type exchanger, and modification.
Figure 9:
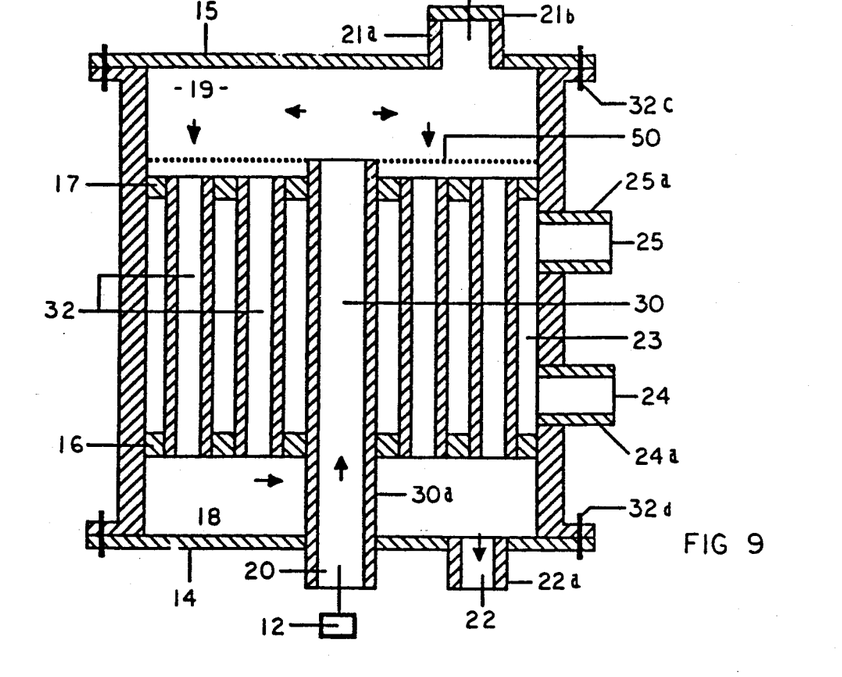
Figure 10:
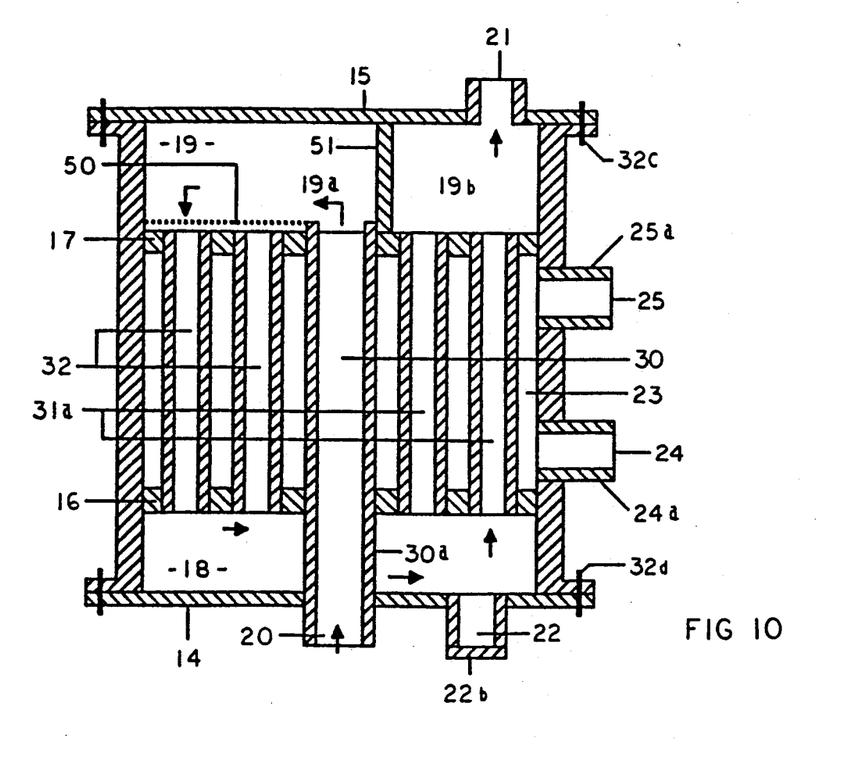

Reference is now made to FIGS. 8-10 showing another form of the invention, incorporating one relatively large bore size pipe 30, as in FIG. 1, and multiple smaller bore size pipes 32, as in FIG. 1. No second large bore size pipe (as at 31 in FIG. 1) is employed. Otherwise, the structure is generally the same as in FIG. 1, and corresponding parts bear the same numbers.

In FIG. 9, the "two-pass" design illustrated provides for hot inlet hydrocarbon fluid flow via pipe 30 to chamber 19 (one-pass), followed by flow backdown through small bore pipes 32 to chamber 18 (second-pass). The cooled flow then exits via primary outlet port 22. Quench fluid enters chamber 23 via secondary inlet port 24, and exits at secondary outlet port 25. Port 21 in removable closure 15 is closed, at 21b. A coke screen (removable) appears at 50.

In FIG. 10 the construction is the same, except that port 22 is closed at 22b; port 21 is open; and wall 51 separates first portion 19a of chamber 19 from second portion 19b. The hot reactor discharge fluid flows upwardly through pipe 30 (first pass through chamber 23), then downwardly from 19a through pipes 32 to chamber 18 (second pass through chamber 23), then back upwardly from 18 to 19b via small bore size pipes 32b (third pass through chamber 23), and then discharges via 21.

I claim:

1. In heat exchanger apparatus for quenching hot hydrocarbon fluid feeds, of different compositions, so as to minimize coking, the combination comprising:
 (a) a shell, and baffle means in the shell, defining spaced first and second chambers, and primary inlet and outlet ports to flow said fluid to and from the shell via the two chambers,
 (b) said shell and baffle means also defining a third chamber between said first and second chambers, with secondary inlet and outlet ports communicating with the third chamber to flow quench fluid to and from the third chamber,
 (c) and pipes of different bore sizes extending through the third chamber, and communicating between the first and second chambers, for passing said hydrocarbon fluid in a selected path of paths via the pipes and first and second chambers, in flowing between said primary inlet and outlet ports,
 (d) and wherein the primary inlet and outlet ports respectively communicate with the first and second chambers, and there being another primary outlet port communicating with the first chamber,
 (e) the shell extending about said chambers and baffle means, and including end closures spaced from said baffle means and closing said chambers, said primary inlet and outlet ports located at said end closures,
 (f) one of said pipes of relatively large bore directly communicating a primary inlet port with the second chamber, by extending continuously and uninterruptedly through one end closure and through the first chamber as well as through the third chamber,
 (g) there being two of said pipes which have relatively large bores, and more than two of said pipes which have relatively smaller bores.

2. The combination of claim 1 including plug means blocking flow through one of said pipes of relatively large bore, another of said pipes of relatively large bore directly communicating a primary inlet port with the second chamber.

3. The combination of claim 1 wherein
 i) one of said pipes of relatively large bore directly communicates a primary inlet port with the second chamber, and
 ii) another of said pipes of relatively large bore directly communicates the first chamber with a primary outlet port.

4. The method of operating a heat exchanger as defined in claim 1, that includes:
 flowing all of inlet fluid through said one of the larger bore pipes directly into the second chamber,
 flowing some of the fluid in the second chamber to a first primary outlet, and
 flowing other of the fluid in the second chamber via the smaller bore tubes and via a second large bore tube to the first chamber,
 and exhausting the fluid in the first chamber via a second primary outlet.

5. The method of operating a heat exchanger as defined in claim 1 in one of the following modes:
 i) flowing all of the inlet fluid through one of the pipes of larger bore size through the third chamber to the second chamber, and then flowing all of the fluid through pipes of smaller bore size from the second to the first chamber to discharge via a primary outlet port associated with the first chamber,
 ii) flowing all of the inlet fluid through one of the pipes of larger bore size through the third chamber to the second chamber, then flowing all of the fluid through pipes of smaller bore size from the second to the first chamber, and then flowing all of the fluid via another of the pipes of larger bore size from the first chamber to a primary outlet port associated with the second chamber.

6. The combination of claim 1 including means removably attaching the end closures to the shell.

7. The combination of claim 1 wherein the primary inlet and outlet ports are associated with the first chamber, whereby all of the fluid flows in two passes through the third chamber.

8. The method of claim 5 wherein one of said modes i) and ii) is selected by removing at least one of two end closures respectively closing said first and second chambers, to gain access to at least one of said first and second chambers for adjusting flow paths therein.

* * * * *